United States Patent [19]

Vortmeyer et al.

[11] Patent Number: 5,664,806
[45] Date of Patent: Sep. 9, 1997

[54] CRASH SYSTEM FOR THE STEERING COLUMN IN A MOTOR VEHICLE

[75] Inventors: Jens Vortmeyer, Preussisch-Oldendorf; Kay Uwe Grams, Cappeln; Burkhard Schäfer, Ganderkesee, all of Germany

[73] Assignee: Lemförder Metallwaren AG, Lemförde, Germany

[21] Appl. No.: 648,566

[22] Filed: May 16, 1996

[30] Foreign Application Priority Data

May 17, 1995 [DE] Germany ............... 195 18 130.1

[51] Int. Cl.⁶ ........................................... B62D 1/18
[52] U.S. Cl. ................................. 280/777; 74/492
[58] Field of Search ..................... 280/777, 775; 74/492, 493

[56] References Cited

U.S. PATENT DOCUMENTS

| | | | |
|---|---|---|---|
| 3,468,182 | 9/1969 | Shwartzberg | 280/777 |
| 3,815,438 | 6/1974 | Johnson | 74/492 |
| 4,086,825 | 5/1978 | Badcock et al. | 74/492 |
| 4,991,871 | 2/1991 | Sadakata | 280/777 |
| 5,464,251 | 11/1995 | Castellon | 280/777 |
| 5,476,284 | 12/1995 | DuRocher et al. | 280/777 |
| 5,477,750 | 12/1995 | Korzan | 280/777 X |

*Primary Examiner*—Christopher P. Ellis
*Attorney, Agent, or Firm*—McGlew and Tuttle

[57] ABSTRACT

A crash system for the steering column in a motor vehicle, in which two tube ends are connected to one another by an insert which clamps the two tube ends to one another up to a predetermined axial load. This insert is a tolerance ring, whose cross-sectional profile is compressible. An adjustable clamping device surrounds the outer tube end and acts radially.

10 Claims, 1 Drawing Sheet

CRASH SYSTEM FOR THE STEERING COLUMN IN A MOTOR VEHICLE

FIELD OF THE INVENTION

The present invention pertains to a crash system for the steering column in a motor vehicle, which is to bring about an axial pushing together of the steering column in the case of a collision of the motor vehicle with an obstacle.

BACKGROUND OF THE INVENTION

Such axial pushing systems for the steering shaft have been known mostly in conjunction with height adjustment devices for the steering wheel. Their principle of action is based on the fact that a safety member, designed for a predetermined load of the steering column, breaks when the predetermined load is exceeded. This results in the components, connected to One another by the safety member, being separated from one another.

Such a system has been known from DE-PS 39 41 049, U.S. Pat. No. 3,788,148, and U.S. Pat. No. 3,392,599, in which an insert is clamped between the tube ends engaging each other with spherical bodies, which press into the material of the tube ends on the outer circumference of the inner tube end and on the inner circumference of the outer tube end, so that a connection, which is sufficiently adapted to rotate in unison and can be loaded up to a maximum, and which must be overcome by the crashing force, is established between the two tube ends. The manufacture of such crash systems is very expensive and can be achieved only approximately in the technical embodiment.

SUMMARY AND OBJECTS OF THE INVENTION

Crash systems are not known in the art in which the crashing force to be overcome, i.e., the force which if exceeded leads to the axial pushing together of the steering column, can be set in a design-independent manner at the time of the installation of the steering column or even immediately prior to its installation.

Correspondingly, the object of the present invention is to provide an axially acting pushing system as a crash safety means for the steering column of a motor vehicle, which is pushed together axially in the case of a crash and which can be set independently from the model of the vehicle and in adaptation to the desired crashing force.

According to the invention, a crash system for the steering column in a motor vehicle is provided in which two tube ends, which engage each other (tubes each with one of their ends engaged) are connected to one another by an insert, which clamps the two tube ends to one another up to a predetermined axial load. The insert includes a commercially available tolerance ring having a compressible cross-sectional profile and the outer tube end is surrounded by an adjustable, radially acting clamping means.

Compared with prior-art systems, such a design offers the advantage that the frictionally engaged connection of the two tube ends which are engaging each other can be adapted to set requirements as desired. Additionally, the adaptation is independent from the physical arrangement of the components of the design. The design guarantees the axially guided pushing together of the two tube ends telescopically engaging each other in the case of a crash.

The features of the present invention are advantageously applied in conjunction with metal tubes, especially steel tubes, and with clamping means consisting of one or more clamping clips and a tightening screw, whose thread has the smallest possible pitch.

Various designs of suitable tolerance rings for the insert between the two tube ends engaging each other are commercially available. The common feature of the tolerance rings is that they have a cross-sectional profile which is compressible, on the one hand, and, on the other hand, it has the property of bringing about a good frictional engagement between the tube ends engaging each other on compression. Tolerance rings with a cross-sectional profile that is wave-shaped in the radial sectional plane are especially suitable. The clamping clip is located at the point at which a tolerance ring is arranged and has a preferably stable cross-sectional profile slotted at one point, so that a tightening screw, whose thread has the smallest possible pitch, makes possible the radial clamping of the tolerance ting between the two tube ends.

A plurality of tolerance rings and dips placed around the outer tube at the point of a tolerance ring may be arranged axially one behind the other if this is required by design circumstances or crashing forces.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
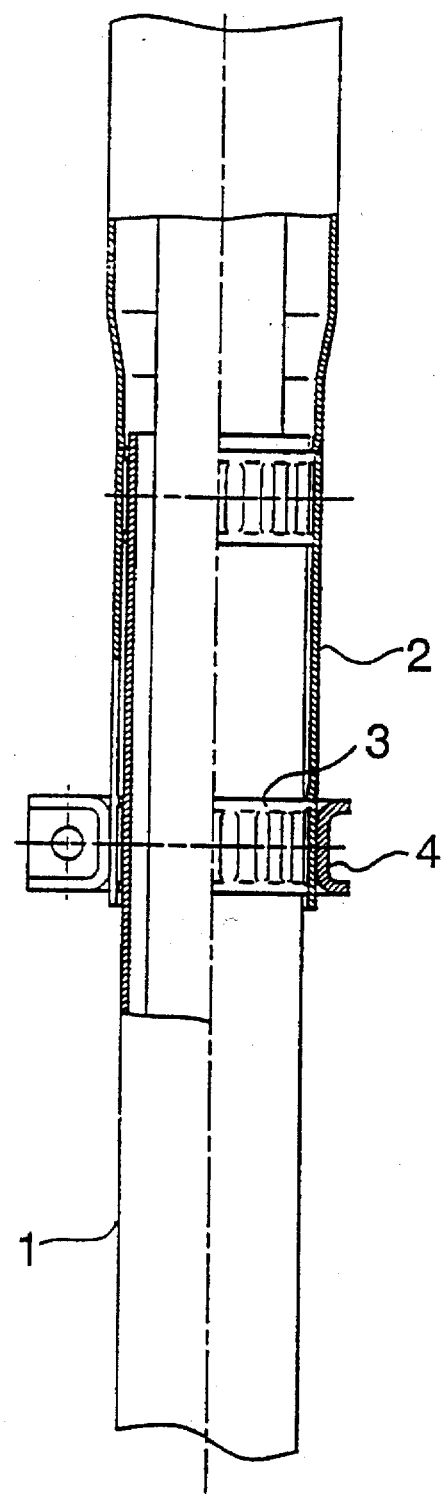
FIG. 1 is a partially schematic sectional view taken in a plane passing through the longitudinal axis.
Figure 2:
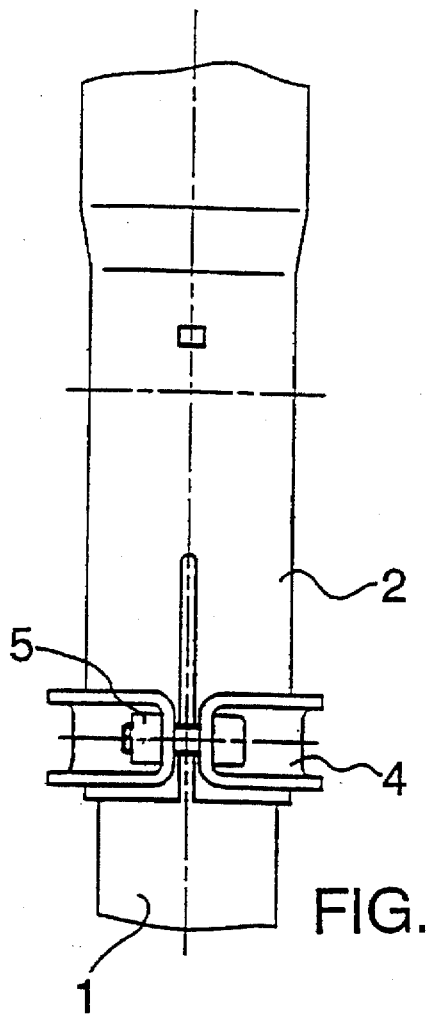
FIG. 2 is a side view of the arrangement according to FIG. 1.
Figure 3:
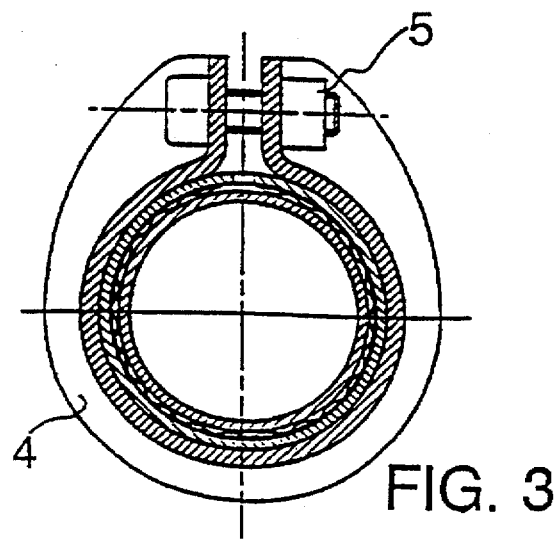
FIG. 3 is a cross sectional of the arrangement shown in FIGS. 1 and 2 in the area of a clamping clip.

Referring to the drawings in particular, the invention comprises a crash system, for the steering column in a motor vehicle. The crash system is provided with metal tubes 1 and 2 with one of their ends engaged. The tubes 1 and 2 are connected to one another by a tolerance ring 3 having a compressible cross-sectional profile. The end of the outer tube 2 is surrounded by an adjustable, radially acting clamping means.

The two metal tubes 1 and 2 are telescopically engaged with each other at one of their ends. The tolerance ring 3 is preferably used which is of a commercially available design. The tolerance ring 3 is arranged at least at one point between the two metal tube ends 1 and 2. At the points at which such a tolerance ring 3 is arranged, a clamping clip 4 of a stable design is located in order to exert radial clamping forces on the tolerance ring 3 arranged between the outer tube 2 and the inner tube 1 as a result. The clamping clip 4 surrounds the outer tube 2 and the ends can be compressed by a tightening screw 5.

In the example shown, the clamping clip 4 has a U-shaped profile in the sectional plane corresponding to FIG. 1. The thread of the tightening screw 5 has a relatively small pitch, so that radial clamping forces can be applied to the tolerance ring and consequently to the two tube ends 1 and 2 telescopically engaging each other in a controlled manner by tightening the nut. The arrangement makes possible a fine adjustment of the frictionally engaged connection thus achieved between the tube ends 1 and 2 with respect to the crashing forces and their controlled propagation in the steering column of a motor vehicle.

According to another embodiment of the invention, a plurality of tolerance rings 3 may be arranged at spaced locations next to each other in the axial direction of the steering column in conjunction with clamping clips 4.

While specific embodiments of the invention have been shown and described in detail to illustrate the application of the principles of the invention, it will be understood that the invention may be embodied otherwise without departing from such principles.

What is claimed is:

1. A crash system for a steering column in a motor vehicle, comprising:

a first tube with a first tube end;

a second tube with a second tube end, said first tube end engaging said second tube end, with said second tube end being radially outwardly disposed relative to said first tube end;

insert means for connecting said first tube end and said second tube end to one another so that said first and second tubes are relatively movable at a predetermined axial load, said insert comprising a tolerance ring having a compressible cross-sectional profile; and clamping means surrounding a portion of said second tube end, said clamping means for adjustably applying a radially acting clamping force onto said second tube which then applies said radial clamping force onto said tolerance ring.

2. A crash system in accordance with claim 1, wherein said clamping means comprises a clamping clip with a tightening screw.

3. A crash system in accordance with claim 1, wherein said clamping means comprises a plurality of clamping clips arranged at spaced locations from one another in an axial direction of the steering column with a tightening screw.

4. A crash system in accordance with claim 1, wherein:

said second tube includes means for being axially compressible.

5. A crash system in accordance with claim 1, wherein:

said clamping means applies a radially inward acting clamping force to said second tube which then applies said radially inward acting clamping force to said tolerance ring, and said tolerance ring applies said radially inward acting clamping force to said first tube.

6. A crash system in accordance with claim 1, wherein:

said clamp means radially compresses said second tube end and said tolerance ring so that said first and second tubes are only relatively movable above a predetermined axial load.

7. A crash system in accordance with claim 1, wherein:

said second tube includes means for being axially compressible;

said clamping means applies a radially inward acting clamping force to said second tube to compress said second tube end and said tolerance ring onto said first tube so that said first and second tubes are relatively movable only above a predetermined axial load.

8. A crash system in accordance with claim 1, wherein:

said clamping means includes a clamping clip with a tightening means for adjusting said predetermined axial load.

9. A safety steering column for a motor vehicle, comprising:

a first tube with a first tube end;

a second tube with a second tube end, said first tube end engaging said second tube end, with said second tube end being radially outwardly disposed relative to said first tube end and having means for being axially compressible;

clamping means surrounding said second tube end for adjustably applying a radially acting clamping force to said second tube;

a tolerance ring positioned radially between said first and second tubes at an axial position of said clamping means, said tolerance ring having a compressible cross-sectional profile, said clamp means radially compressing said second tube end and said tolerance ring onto said first tube so that said first and second tubes are only relatively movable above a predetermined axial load.

10. A crash system in accordance with claim 9, wherein:

said clamping means includes a clamping clip with a tightening means for adjusting said predetermined axial load.

* * * * *